United States Patent
Que et al.

(10) Patent No.: US 11,280,337 B2
(45) Date of Patent: Mar. 22, 2022

(54) PUMP BODY ASSEMBLY AND COMPRESSOR HAVING CRANK SHAFT WITH ECCENTRIC COMPONENTS, DISC PARTITION PLATE, AND ANNULAR PARTITION PLATE

(71) Applicant: Green Refrigeration Equipment Engineering Research Center of Zhuhai Gree Co., Ltd., Zhuhai (CN)

(72) Inventors: Peizhen Que, Zhuhai (CN); Yanjun Hu, Zhuhai (CN); Ouxiang Yang, Zhuhai (CN); Yuanbin Zhai, Zhuhai (CN); Liu Xiang, Zhuhai (CN); Jianfeng Huang, Zhuhai (CN)

(73) Assignee: GREEN REFRIGERATION EQUIPMENT ENGINEERING RESEARCH CENTER OF ZHUHAI GREE CO., LTD., Zhuhai (CN)

(*) Notice: Subject to any disclaimer, the term of this patent is extended or adjusted under 35 U.S.C. 154(b) by 268 days.

(21) Appl. No.: 16/280,898

(22) Filed: Feb. 20, 2019

(65) Prior Publication Data
US 2019/0249668 A1 Aug. 15, 2019

Related U.S. Application Data

(63) Continuation of application No. PCT/CN2017/100147, filed on Sep. 1, 2017.

(30) Foreign Application Priority Data

Sep. 18, 2016 (CN) .......................... 201610829958.0

(51) Int. Cl.
*F04C 18/356* (2006.01)
*F16C 3/14* (2006.01)
(Continued)

(52) U.S. Cl.
CPC ...... *F04C 18/3564* (2013.01); *F04C 29/0042* (2013.01); *F04C 29/028* (2013.01);
(Continued)

(58) Field of Classification Search
CPC ............... F04C 18/3564; F04C 29/028; F16C 2360/42; F16C 3/14
See application file for complete search history.

(56) References Cited

U.S. PATENT DOCUMENTS

2011/0027117 A1* 2/2011 Fujino ................... F04C 23/008
418/88
2013/0171017 A1 7/2013 Park et al.

FOREIGN PATENT DOCUMENTS

CN 103147987 A 6/2013
CN 203161538 U 8/2013
(Continued)

OTHER PUBLICATIONS

Machine Translation of JP 2011-157921 A, "Two-Cylinder Rotary Compressor", Inventor: OKA, Published on Aug. 18, 2011. (Year: 2011).*

(Continued)

*Primary Examiner* — Mary Davis
(74) *Attorney, Agent, or Firm* — Brandon V. Zuniga; James R. Gourley; Carstens & Cahoon, LLP (57) ABSTRACT

Disclosed is a crank shaft, including a central rotation shaft, a first eccentric component, a second eccentric component, a disc partition plate and an annular partition plate, wherein the disc partition plate is disposed between the first eccentric component and the second eccentric component, and is integrally formed with the central rotation shaft, and the annular partition plate is sleeved outside the disc partition plate. The crank shaft can prevent the occurrence of leakage between the partition plate and a roller while increasing an (Continued)

eccentricity of the crank shaft and improving operating performances of a compressor. Further disclosed are a pump body assembly having the crank shaft and a compressor.

14 Claims, 8 Drawing Sheets

(51) Int. Cl.
   *F04C 29/02* (2006.01)
   *F04C 29/00* (2006.01)
(52) U.S. Cl.
   CPC ............ *F16C 3/14* (2013.01); *F04C 2240/60* (2013.01); *F16C 2360/42* (2013.01)

(56) References Cited

FOREIGN PATENT DOCUMENTS

| | | |
|---|---|---|
| CN | 104024640 | 9/2014 |
| CN | 104179685 | 12/2014 |
| CN | 204877956 | 12/2015 |
| CN | 105392995 A | 3/2016 |
| CN | 106246551 | 12/2016 |
| CN | 206190529 U | 5/2017 |
| EP | 2613053 A2 | 7/2013 |
| EP | 2881588 A1 | 6/2015 |
| JP | H0547471 U | 6/1993 |
| JP | 2011157921 A | 8/2011 |
| JP | 5466027 B2 | 4/2014 |
| JP | 2015068262 A | 4/2015 |
| JP | 2015113744 | 6/2015 |
| JP | 2015194093 A | 11/2015 |

OTHER PUBLICATIONS

Machine Translation of JP 5466027 B2, "2 cylinder rotary compressor", Inventor and Assignee are in Japanese, Published on Apr. 9, 2014. (Year: 2014).*
Advertisement for Heavy Duty Rhino Aluminum foil on Amazon. com, 2021. (Year: 2021).*
Extended European Search Report dated Jan. 30, 2020 for European Application No. EP17850194.6 (6 pages).

* cited by examiner

PUMP BODY ASSEMBLY AND COMPRESSOR HAVING CRANK SHAFT WITH ECCENTRIC COMPONENTS, DISC PARTITION PLATE, AND ANNULAR PARTITION PLATE

CROSS REFERENCE TO RELATED APPLICATIONS

This application is a continuation application of PCT Patent Application No. PCT/CN2017/100147, entitled "CRANK SHAFT, PUMP BODY ASSEMBLY AND COMPRESSOR", filed on Sep. 1, 2017, which claims priority to Chinese Patent Application No. 201610829958.0, entitled "CRANK SHAFT, PUMP BODY ASSEMBLY AND COMPRESSOR", filed on Sep. 18, 2016, the entire contents of which are incorporated herein by reference.

TECHNICAL FIELD

The present invention relates to the technical field of gas compression, and more particularly, to a pump body assembly and a compressor.

BACKGROUND

The double-rotor compressor is characterized by having a large refrigeration capacity and operating stably, and is widely used in air conditioning systems. The existing double-rotor compressor is constructed by axially stacking two cylinders separated by a partition plate. The crank shaft has two eccentric components, which are respectively provided with a roller.

For the miniaturization and low cost design of the compressor, it is necessary to achieve a greater displacement on a relatively smaller size compressor structure. At present, a greater displacement is realized mainly by increasing the height and the diameter of the cylinder, and increasing the eccentricity of the crank shaft. However, increasing the height and the diameter of the cylinder requires an increase in size of the structure, therefore it is difficult to achieve miniaturization and low cost, moreover, the force exerted on the crank shaft is increased and the reliability of the crank shaft is worsened. While increasing the displacement of the compressor by increasing the eccentricity of the crank shaft can realize the miniaturization and low cost.

Figure 1:
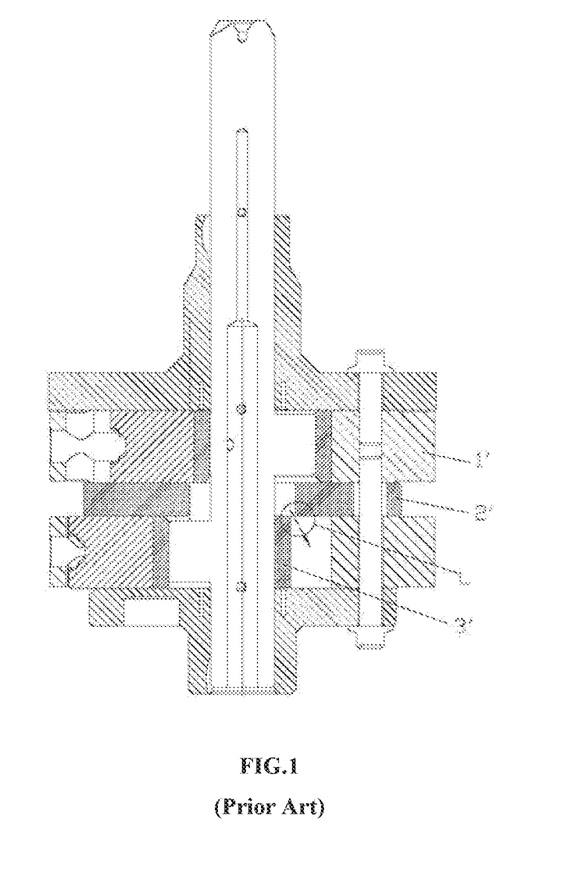
FIG. 1 is a structural cross-section view of the pump body assembly in the prior art.

As shown in FIG. 1, after the eccentricity of the crank shaft is increased, the intermediate partition plate 2' must be larger than the outer periphery of the eccentric component 1', so as to enable the intermediate partition plate 2' to pass through one eccentric component 1'. As the eccentricity is too large, there will be a gap at a location L between the outer periphery of the roller 3' and the through hole of the intermediate partition plate 2'. In the process of compression, the refrigerant will pass through the gap at the location L, failing to realize the seal of the compressor chamber.

An existing solution is to divide the intermediate partition plate into two portions, and the through hole in the center of the partition plate is reduced by fitting the two portions together to form the partition plate. The solution can also realize the seal between the partition plate and the roller with a design of a crank shaft having a larger eccentricity. However, the above solution of dividing the partition plate into portions and re-fitting the portions together to form a complete partition plate has processing difficulties; the precision requirements for processing and assembling the parts are extremely high, and it is difficult to realize mass production; moreover, seams are easily formed at the joint, causing leakage and resulting in degradation of sealing properties; and a height difference exists as it is difficult for the two portions joined together to be of the same height, and the height difference is unfavorable for the roller to run freely on the surface of the partition plate.

SUMMARY OF THE INVENTION

The embodiments of the present invention provide a crank shaft, a pump body assembly and a compressor, which can increase the eccentricity of the crank shaft while avoiding leakage between the partition plate and the roller and improving the working performances of the compressor.

In order to achieve the objective above, an embodiment of the present invention provides a crank shaft including a central rotating shaft, a first eccentric component, a second eccentric component, a disc partition plate and an annular partition plate; wherein, the disc partition plate is disposed between the first eccentric component and the second eccentric component, and is integrally formed together with the central rotating shaft; the annular partition plate is sleeved outside the disc partition plate.

The present invention further provides a pump body assembly comprising a crank shaft, an upper cylinder and a lower cylinder. The crank shaft includes a central rotating shaft, a first eccentric component, a second eccentric component, a disc partition plate and an annular partition plate. The disc partition plate is disposed between the first eccentric component and the second eccentric component, and is integrally formed together with the central rotating shaft. The annular partition plate is sleeved outside the disc partition plate.

In an embodiment, an inner diameter $\Phi B$ of the annular partition plate and an outer diameter $\Phi D$ of the disc partition plate satisfy $(\Phi B - \Phi D) > 0.01$ mm.

In an embodiment, a first thickness $H1$ of the disc partition plate and a second thickness $H2$ of the annular partition plate satisfy $(H2 - H1) > 0.01$ mm.

The upper cylinder is sleeved outside the first eccentric component; and the lower cylinder is sleeved outside the second eccentric component.

In an embodiment, an outer diameter $\Phi D$ of the disc partition plate and an inner diameter $\Phi C$ of the upper cylinder or the lower cylinder satisfy $\Phi D - \Phi C > 2$ mm.

In an embodiment, the disc partition plate is disposed between the upper cylinder and the lower cylinder, and forms a clearance fit with the upper cylinder.

In an embodiment, an annular oil groove is provided on an inner periphery surface of the annular partition plate or on an outer periphery surface of the disc partition plate; and an oil channel is provided to allow oil to be inputted into the annular oil.

In an embodiment, the annular oil groove is provided on the inner periphery surface of the annular partition plate; and the oil channel is an oil hole radially passing through the annular partition plate.

In an embodiment, the upper cylinder, the annular partition plate and the lower cylinder are connected with bolts in a rigid manner.

In an embodiment, an upper end of an outer periphery wall of the disc partition plate is provided with a first enthalpy-adding groove, which is in communication with a compression chamber of the upper cylinder; the annular partition plate is provided with an enthalpy-adding hole; a first communication channel, through which the first enthalpy-adding groove is in communication with the enthalpy-adding hole, is disposed on a bottom of the upper cylinder; and/or a lower end of the outer periphery wall of the disc partition plate is provided with a second enthalpy-adding groove, which is in communication with a compression chamber of the lower cylinder, and the annular partition plate is provided with an enthalpy-adding hole, and a second communication channel, through which the second enthalpy-adding groove is in communication with the enthalpy-adding hole, is disposed on a top of the lower cylinder.

In an embodiment, the first enthalpy-adding groove and the second enthalpy-adding groove are disposed on the disc partition plate; the enthalpy-adding hole is a three-way enthalpy-adding hole including a radially extended inlet, and a first outlet and a second outlet which are in communication with the inlet; wherein, the first outlet is in communication with the first enthalpy-adding groove through the first communication channel; and the second outlet is in communication with the second enthalpy-adding groove through the second communication channel.

In an embodiment, the first communication channel and the second communication channel are both curved grooves.

In an embodiment, the upper cylinder is provided with a first slide groove; the lower cylinder is provided with a second slide groove; an intersection angle θ1 is formed between a starting end of the first communication channel and the first slide groove, and an intersection angle θ2 is formed between the second communication channel and the second slide groove, which satisfy 30°<θ1<80° and 30°<θ2<80°.

In an embodiment, an intersection angle β1 of the first communication channel satisfies 30°β1<100°, and an intersection angle β2 of the second communication channel satisfies 30°β2<100°.

The present invention further provides a compressor comprising the pump body assembly above.

In an embodiment, the compressor is a double-cylinder compressor, a multi-cylinder compressor, or a multi-stage compressor.

According to the technical scheme of the present invention, the crank shaft includes a central rotating shaft, a first eccentric component, a second eccentric component, a disc partition plate and an annular partition plate. The disc partition plate is disposed between the first eccentric component and the second eccentric component, and is integrally formed together with the central rotating shaft. The annular partition plate is sleeved outside the disc partition plate. The partition plates of the crank shaft include the disc partition plate and the annular partition plate. The disc partition plate is integrally formed together with the central rotating shaft, thus the center of the partition plate is solid and it is not necessary to dispose a mounting hole to allow the first eccentric component and the second eccentric component to pass through, thereby avoiding the refrigerant leakage through the gap between the mounting hole of the partition plate and the roller due to the oversize mounting hole. As the installation of the partition plate is not affected by the first eccentric component and the second eccentric component, the eccentricity of the crank shaft can be made large enough to effectively increase the displacement of the compressor. The disc partition plate is integrally formed with the central rotating shaft and therefore it is not necessary to fit portions to form the partition plate, which reduces the difficulty in processing the partition plate and ensures a better integrity of the partition plate. The partition plate fits the cylinder better, thereby improving the working performances of the compressor.

DESCRIPTION OF THE REFERENCE NUMERALS 1. central rotating shaft; 2. first eccentric component; 3. second eccentric component; 4. annular partition plate; 5. upper cylinder; 6. lower cylinder; 7. oil groove; 8. oil hole; 9. bolt; 10. first enthalpy-adding groove; 11. second enthalpy-adding groove; 12. first communication channel; 13. second communication channel; 14. three-way enthalpy-adding hole; 15. first slide groove; 16. second slide groove; 17. housing; 18. disc partition plate; 19. evaporator; 20. condenser; 21. first-stage throttle mechanism; 22. second-stage throttle mechanism; 23. flash evaporator; 24. electromagnetic valve; 25. non-return valve; 26. upper end cover; 27. lower end cover.

DETAILED DESCRIPTION OF THE PREFERRED EMBODIMENTS

The present invention will be further described in more details with reference to the accompanying figures and embodiments, but the specific embodiments are not to limit the scope of the present invention.

Figure 3:
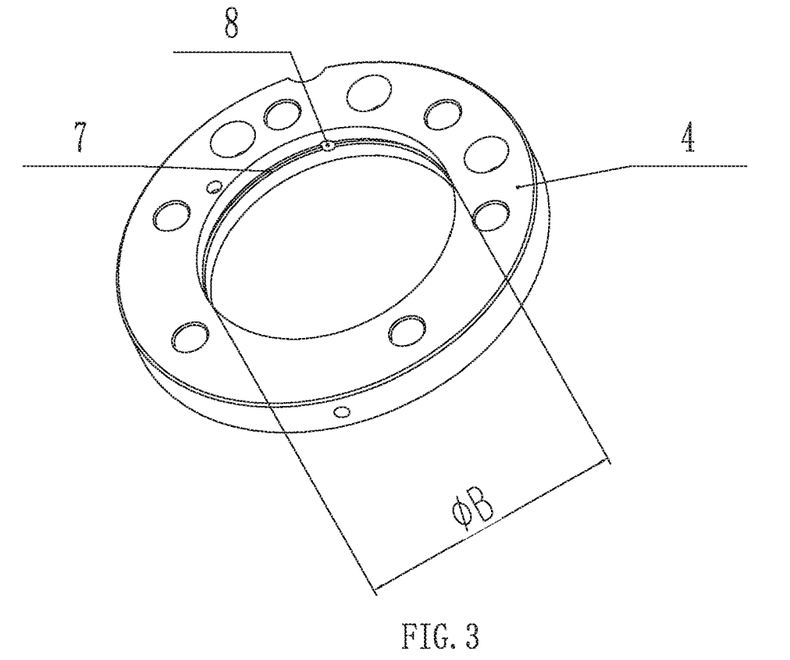
FIG. 3 is a perspective structural view of the annular partition plate of the crank shaft of the pump assembly of the compressor according to the first embodiment of the present invention.
Figure 4:
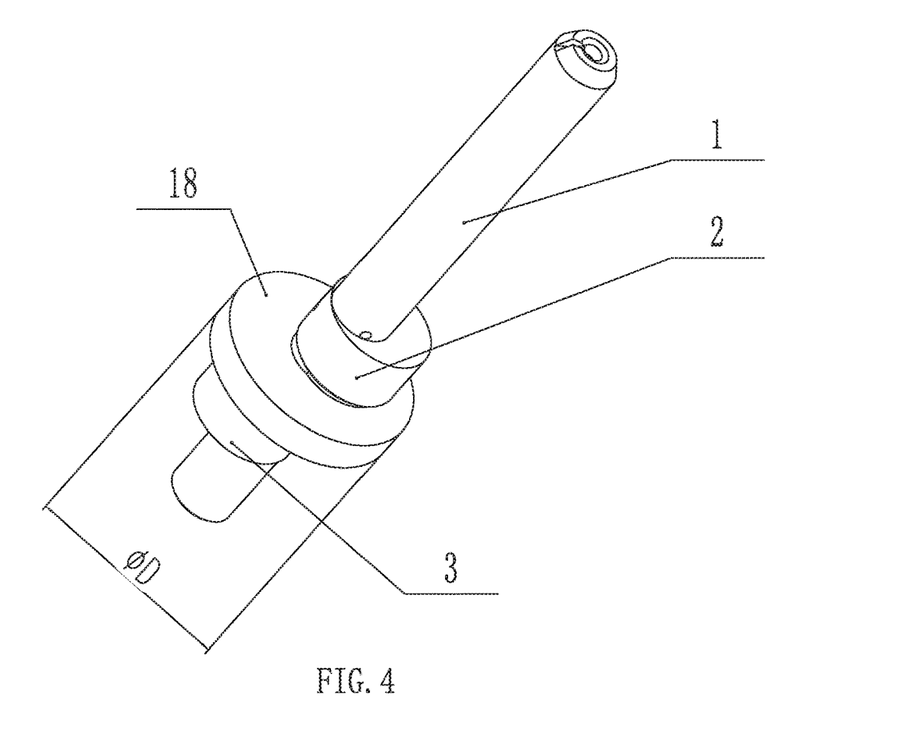
FIG. 4 is a perspective structural view of the crank shaft of the pump assembly of the compressor according to the first embodiment of the present invention.

According to an embodiment of the present invention, as shown in FIGS. 3 and 4, the crank shaft includes a central rotating shaft 1, a first eccentric component 2, a second eccentric component 3, a disc partition plate 18 and an annular partition plate 4. The disc partition plate 18 is disposed between the first eccentric component 2 and the second eccentric component 3, and is integrally formed together with the central rotating shaft 1. The annular partition plate 4 is sleeved outside the disc partition plate 18.

The partition plates of the crank shaft include the disc partition plate 18 and the annular partition plate 4. The disc partition plate 18 is integrally formed together with the central rotating shaft 1, thus the center of the partition plate is solid and needs not to be provided with a mounting hole to allow the first eccentric component 2 and the second eccentric component 3 to pass through, thereby avoiding the refrigerant leakage through the gap between the partition plate and the mounting hole of the roller, which is caused by the oversize mounting hole. As the installment of the partition plate is not affected by the first eccentric component 2 and the second eccentric component 3, the eccentricity of the crank shaft can be large enough to effectively increase the displacement of the compressor. The disc partition plate 18 is integrally formed with the central rotating shaft 1 and therefore needs not to be pieced, which reduces the difficulty in processing the partition plate and ensures better integrity of the partition plate. The partition plate fits the cylinder better, thereby improving the working performances of the compressor.

The annular partition plate 4 couples with the disc partition plate 18 in a rotatable manner, which enables the annular partition plate to be connected with other components of the pump body assembly in a rigid manner, without affecting the rotation of the disc partition plate 18 along with the central rotating shaft 1, and enables the partition plates to take good effects integrally on installing, fixing and separating.

In an embodiment, the disc partition plate 18 forms a clearance fit with the annular partition plate 4, thereby reducing wear occurring during the rotation of the disc partition plate 18 relative to the annular partition plate 4, reducing wear and tear between the disc partition plate 18 and the annular partition plate 4, and prolonging the service life of these two partition plates. Additionally, the clearance between these two partition plates also enables the lubricant to arrive at the surfaces of the relative motion of the two partition plates and to lubricate and cool the surfaces, thereby improving the working performances of the disc partition plate 18 and the annular partition plate 4.

In an embodiment, the inner diameter $\Phi B$ of the annular partition plate 4 and the outer diameter $\Phi D$ of the disc partition plate 18 satisfy $\Phi B - \Phi D > 0.01$ mm, which enables the clearance between the inner periphery of the annular partition plate 4 and the outer periphery of the disc partition plate 18 to be large enough to avoid wear occurring during relative motion of the annular partition plate 4 and the disc partition plate 18. The gap should also be limited within a certain range, to prevent excessive clearance from affecting the circumferential fit between the disc partition plate 18 and the annular partition plate 4.

The first thickness H1 of the disc partition plate 18 and the second thickness H2 of the annular partition plate 4 satisfy H2−H1>0.01 mm. The second thickness H2 of the annular partition plate 4 is greater than the first thickness H1 of the disc partition plate 18, therefore the disc partition plate 18 is kept from contacting the upper cylinder and the lower cylinder by coupling the annular partition plate 4 with the upper cylinder and the lower cylinder, and a gap remains between the disc partition plate 18 and the end surface of the upper cylinder, to avoid friction generated between the disc partition plate 18 and the upper cylinder during the rotation of the disc partition plate 18 along with the central rotating shaft 1, thereby reducing possible wear occurring between the disc partition plate 18 and the upper cylinder, prolonging the service life of the disc partition plate 18, reducing the power required by the crank shaft for rotating, reducing extra power loss, and improving the rotation efficiency of the crank shaft.

Figure 2:
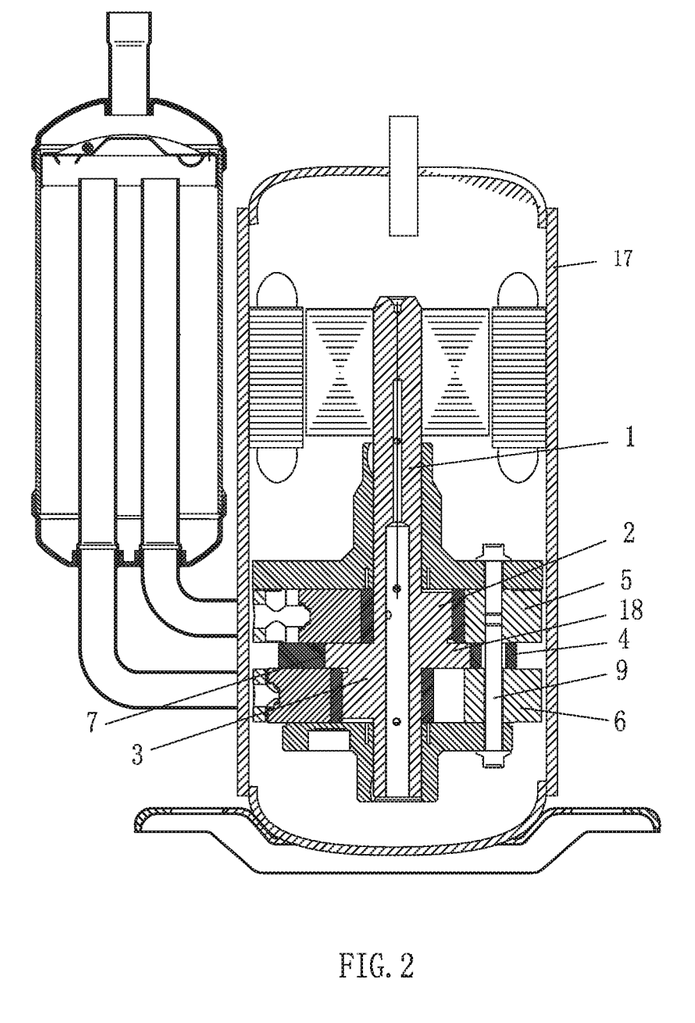
FIG. 2 is a structural cross-section view of the compressor according to the first embodiment of the present invention.
Figure 5:
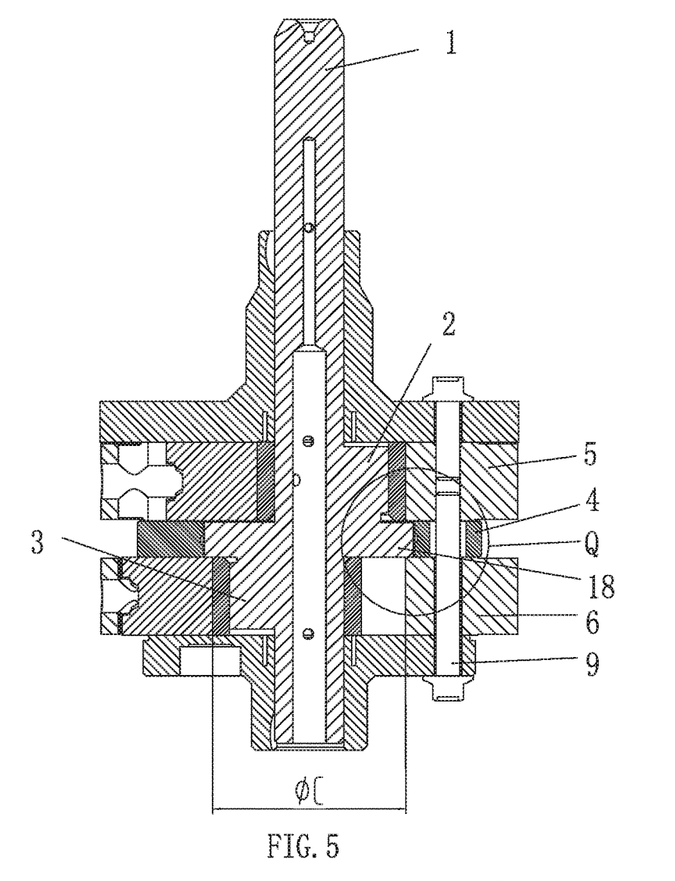
FIG. 5 is a structural cross-section view of the pump body assembly of the compressor according to the first embodiment of the present invention.
Figure 6:
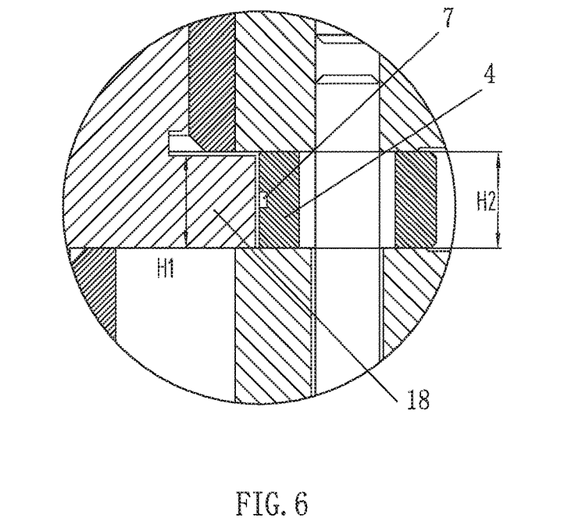
FIG. 6 is an enlarged structural view of the location Q shown in FIG. 5.

According to the first embodiment of the pump body assembly of the present invention, as shown in FIGS. 2, 5 and 6, the pump body assembly includes a crank shaft, an upper cylinder 5 and a lower cylinder 6. The crank shaft is just the same crank shaft described above. The upper cylinder 5 is sleeved outside the first eccentric component 2, and the lower cylinder 6 is sleeved outside the second eccentric component 3. In the pump body assembly, the upper cylinder 5 and the lower cylinder 6 couple with the disc partition plate 18, to form an axial limitation to the disc partition plate 18. Additionally, the annular partition plate 4 is connected to the upper cylinder 5 and the lower cylinder 6 in a rigid manner, to form a circumferential limitation to the disc partition plate 18, thereby enabling the crank shaft through the disc partition plate supported on the upper end surface of the lower cylinder 6 to be installed and positioned stably.

In an embodiment, the outer diameter $\Phi D$ of the disc partition plate 18 and the inner diameter $\Phi C$ of the cylinder satisfy $\Phi D - \Phi C > 2$ mm, that is, the outer diameter of the disc partition plate 18 is greater than the inner diameter of the cylinder, wherein, the inner diameter of the cylinder refers to the larger one of the inner diameters of the cylinder 5 and the lower cylinder 6. The outer diameter of the disc partition plate 18 is greater than the inner diameter of the cylinder by a certain quantity, which enables the disc partition plate 18 to be large enough to avoid a communication channel formed between the disc partition plate and either of two cylinders, thereby preventing the refrigerant leakage from the communication channel between the disc partition plate and the inner cavity of the cylinder, and improving the stability and reliability of the crank shaft and the structure fitted between the cylinders.

The disc partition plate 18 is disposed between the upper cylinder 5 and the lower cylinder 6, and forms a clearance fit with the upper cylinder 5. In this structure, the thickness of the disc partition plate 18 is less than the distance between the lower end surface of the upper cylinder 5 and the upper end surface of the lower cylinder 6, and the bottom of the disc partition plate 18 is supported by the upper end surface of the lower cylinder 6, ensuring the crank shaft to have a good axial positioning structure. Alternatively, the disc partition plate 18 forms a clearance fit respectively with the upper cylinder 5 and the lower cylinder 6, and the axial positioning of the crank shaft is mainly achieved by coupling the second eccentric component 3 with the lower end cover 27.

In an embodiment, an annular oil groove 7 is provided on the inner periphery surface of the annular partition plate 4 or on the outer periphery surface of the disc partition plate 18, and the annular oil groove 7 is in fluid communication with an oil basin through an oil channel. During the rotation of the disc partition plate 18, the oil in the oil basin passes through the oil channel and enters the oil groove 7, then is distributed on the periphery fitting surfaces of the annular partition plate 4 and the disc partition plate 18, to lubricate and cool for the rotation of the annular partition plate 4 and the disc partition plate 18. The oil channel is disposed on the annular partition plate 4. The annular partition plate 4 is connected to the upper cylinder 5 and the lower cylinder 6 in a rigid manner, so the oil in the oil basin is steadily conveyed to the oil groove 7 through the oil channel, thereby ensuring a stable and continuous supply of lubricating oil.

In this embodiment, the oil groove 7 is provided on the inner periphery surface of the annular partition plate 4; the oil channel is an oil hole 8 radially passing through the annular partition plate 4, which enables the oil outside the pump body assembly to be easily introduced, through the oil hole 8, into the oil groove 7 on the inner periphery surface of the annular partition plate 4. In order to facilitate the entry of the oil, the oil hole 8 is configured to be inclined downwards in the flow direction of oil.

In an embodiment, the upper cylinder 5, the annular partition plate 4 and the lower cylinder 6 are connected with bolts 9 in a rigid manner, which improves the stability of the connection structure between the upper cylinder 5, the annular partition plate 4 and the lower cylinder 6 and ensures tightness of the connection therebetween, thereby improving the working performances of the pump body assembly.

According to the pump body assembly of the present embodiment, the crank shaft has a disc partition plate 18 disposed between the first eccentric component 2 and the second eccentric component 3. The disc partition plate 18 and the central rotating shaft 1 of the crank shaft are integral, and the disc partition plate 18 is rotatable together with the central rotating shaft 1. A circular partition plate 4 is disposed between the upper cylinder 5 and the lower cylinder 6, and the disc partition plate 18 of the crank shaft is disposed between the upper cylinder 5 and the lower cylinder 6. The disc partition plate 18 of the crank shaft is disposed inside the inner periphery of the annular partition plate 4, to form a clearance fit between the outer periphery surface of the disc partition plate 18 and the inner periphery surface of the annular partition plate 4. The outer diameter $\Phi D$ of the disc partition plate 18 is less than the inner diameter $\Phi B$ of the annular partition plate 4, and is greater than the inner diameter $\Phi C$ of the upper cylinder 5 and the lower cylinder 6. The dimensions satisfy $\Phi B - \Phi D > 0.01$ mm, and $\Phi D - \Phi C > 2$ mm. According to the dimensional relationship above, the lower end surface of the disc partition plate 18 of the crank shaft is supported on the upper end surface of the lower cylinder 6. Further, the thickness H1 of the disc partition plate 18 and the thickness H2 of the annular partition plate 4 satisfy $H2 - H1 > 0.01$ mm. That is to say, the disc partition plate 18 of the crank shaft is arranged between the upper cylinder 5 and the lower cylinder 6, and is axially limited between the end surface of the upper cylinder and the end surface of the lower cylinder, and is circumferentially limited in the inner periphery of the annular partition plate 4.

Additionally, the upper roller and the lower roller are respectively sleeved on the first eccentric component 2 and the second eccentric component 3 of the crank shaft, and are partitioned by the disc partition plate 18 of the crank shaft. The upper roller rotates together with the first eccentric component 2 of the crank shaft. An upper compression chamber is formed and sealed by the upper end surface of the disc partition plate 18 of the crank shaft, the lower end surface of the upper bearing and the inner periphery of the upper cylinder 5. The upper slip piece fits the outer periphery of the upper roller, to space the upper compression chamber to be a high pressure chamber and a low pressure chamber, thereby realizing the refrigerant compression in the upper cylinder 5. Similarly, the lower roller rotates together with the second eccentric component 3 of the crank shaft. A lower compression chamber is formed and sealed by the lower end surface of the disc partition plate 18 of the crank shaft, the upper end surface of the lower bearing and the inner periphery of the lower cylinder 6. The lower slip piece fits the lower roller, to space the lower compression chamber to be a high pressure chamber and a low pressure chamber, thereby realizing the refrigerant compression in the lower cylinder 6.

The disc partition plate 18 integrally formed with the central rotating shaft 1 is arranged between the first eccentric component 2 and the second eccentric component 3 of the crank shaft, thus the lower end surface of the disc partition plate 18 is supported on the upper end surface of the lower cylinder 6 to realize the axial support. Additionally, the chamber of the upper cylinder 5 and the chamber of the lower cylinder 6 are spaced by the disc partition plate 18, thereby achieving two compression chambers and preventing refrigerant leakage between the partition plate and the cylinders.

In addition, in order to ensure the lubrication between the outer periphery of the disc partition plate 18 and the inner periphery of the annular partition plate 4, and the lubrication between the end surface of the upper cylinder and the end surface of the lower cylinder, the circular oil groove 7 is provided on the inner periphery surface of the annular partition plate 4, and the annular oil groove 7 is in fluid communication with the oil basin outside the pump body assembly through the oil hole 8, thereby ensuring the axial lubrication and the circumferential lubrication of the disc partition plate 18 of the crank shaft during rotation, and also ensuring the sealing between the fitting surfaces and reducing gas refrigerant leakage between the upper cylinder and the lower cylinder.

According to the forgoing structure of the present invention, in the double-cylinder compressor, the disc partition plate 18 integrated with the central rotating shaft 1 is disposed between the first eccentric component 2 and the second eccentric component 3 of the crank shaft, thus the crank shaft is enlarged greatly, increasing the effective volume of the compressor, solving the problem of leakage between the outer periphery of the roller and the inner periphery of the partition plate after the eccentricity of the conventional compressor is increased, and achieving miniaturization and low costs of the compressor.

As shown in FIGS. 7 to 12, the second embodiment of a pump body assembly of the present invention is identical to the first embodiment of the pump body assembly in the basic structure, except that, in the second embodiment, an enthalpy-adding gas blowing structure for the upper cylinder 5 and/or the lower cylinder 6 is further provided on the base of the first embodiment, to realize double-cylinder enthalpy-adding operation and further improve the refrigeration capacity and energy efficiency of the compressor.

In the second embodiment, the upper end of the outer periphery wall of the disc partition plate 18 is provided with a first enthalpy-adding groove 10, which is in communication with the compression chamber of the upper cylinder 5, and the annular partition plate 4 is provided with an enthalpy-adding hole. A first communication channel 12, through which the first enthalpy-adding groove 10 is in communication with the enthalpy-adding hole, is disposed on the bottom of the upper cylinder 5; and/or the lower end of the outer periphery wall of the disc partition plate 18 is provided with a second enthalpy-adding groove 11, which is in communication with the compression chamber of the lower cylinder 6, and the annular partition plate 4 is provided with an enthalpy-adding hole. A second communication channel 13, through which the second enthalpy-adding groove 11 is in communication with the enthalpy-adding hole, is disposed on the top of the lower cylinder 6.

In this embodiment, the first enthalpy-adding groove 10 and the second enthalpy-adding groove 11 are disposed on the disc partition plate 18; the enthalpy-adding hole is a three-way enthalpy-adding hole 14 including a radially extended inlet, and a first outlet and a second outlet which are in communication with the inlet. Wherein, the first outlet is in communication with the first enthalpy-adding groove 10 through the first communication channel 12, and the second outlet is in communication with the second enthalpy-adding groove 11 through the second communication channel 13. The supplied and enthalpy-adding gas refrigerant is introduced to the annular partition plate 4 through the inlet of the three-way enthalpy-adding hole 14, and then is divided into two streams. One stream of gas refrigerant flows through the first outlet, the first communication channel 12 and the first enthalpy-adding groove 10, and enters the compression chamber of the upper cylinder 5; the other stream of gas refrigerant flows through the second outlet, the second communication channel 13 and the second enthalpy-adding groove 11, and enters the compression chamber of the lower cylinder 6, thus supplying gas and adding enthalpy for the compressor are completed. The refrigeration capacity and working efficiency of the compressor is effectively improved by supplying gas and adding enthalpy for the compressor.

In an embodiment, the first communication channel 12 and the second communication channel 13 are both curved grooves. The shape of the first communication channel 12 and the shape of the second communication channel 13 respectively match with the shape of the inner cavity of the corresponding cylinder thereon, so that the adding enthalpy process of the supplied and enthalpy-adding gas refrigerant is steady and smooth, thereby achieving good effect of adding enthalpy, and improving the efficiency of supplying gas and adding enthalpy.

In an embodiment, the upper cylinder 5 is provided with a first slide groove 15, and the lower cylinder 6 is provided with a second slide groove 16. The intersection angle θ1 between the starting end of the first communication channel 12 and the first slide groove 15, and the intersection angle θ2 between the second communication channel 13 and the second slide groove 16 satisfy 30°<θ1<80° and 30°<θ2<80°. Thus structure effectively ensures the first enthalpy-adding groove 10 and the first communication channel 12 to be spaced when the pressure in the compressor chamber reaches the pressure of adding enthalpy, or ensures the second enthalpy-adding groove 11 and the second communication channel 13 to be spaced, so as to prevent the compressed refrigerant from flowing back to the inlet of enthalpy-adding gas and improve the stability of supplying gas and adding enthalpy.

In an embodiment, the intersection angle β1 of the first communication channel 12 satisfies 30°β1<100°, the intersection angle β2 of the second communication channel 13 satisfies 30°β2<100°. Such structure enables the first communication channel 12 and the second communication channel 13 to be long enough to meet the requirements of injecting enthalpy-adding gas, thereby improving the capacity of supplying gas and adding enthalpy of the compressor, and enhancing the effect of supplying gas and adding enthalpy of the compressor.

Of course, supplying gas and adding enthalpy may be performed only in the upper cylinder 5 or in the lower cylinder 6, thereby reducing the processing difficulty.

Figure 7:
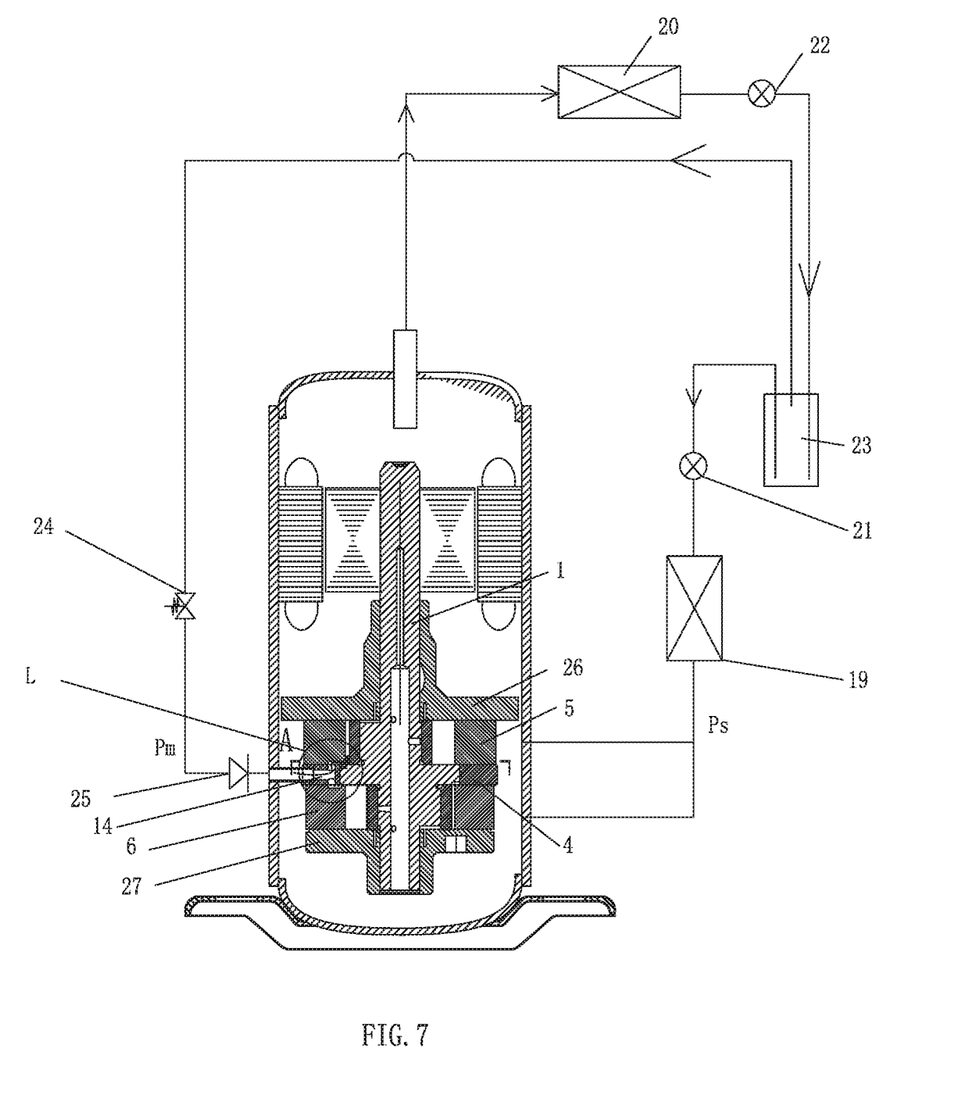
FIG. 7 is a structural view of the compressor according to the second embodiment of the present invention.

In the pump body assembly of this embodiment, the low-pressure Ps refrigerant from the evaporator 19 flows into the gas intake ports of the upper cylinder 5 and the lower cylinder 6 of the compressor. After the upper cylinder 5 and the lower cylinder 6 finish sucking gas, the refrigerant starts to be compressed and is mixed with the medium-pressure Pm refrigerant from the enthalpy-adding pipe of the three-way enthalpy-adding hole 14; then the roller compresses the mixed refrigerant to be high-pressure refrigerant, and the high-pressure refrigerant is finally discharged from the compressor and enters the condenser 20. Afterwards, the high-pressure refrigerant is throttled by the first-stage throttle mechanism 21, and enters the flash evaporator 23 to be flash evaporated; the medium-pressure Pm gas refrigerant flows into the enthalpy-adding pipeline, passes through the electromagnetic valve 24 and the non-return valve 25, then passes through the inlet of the enthalpy-adding pipeline of the three-way enthalpy-adding hole 14 and flows into the compression chamber of the upper cylinder and the compression chamber of the lower cylinder, being mixed with the low-pressure Ps refrigerant. The liquid refrigerant in the flasher evaporator 23 is throttled by the secondary throttle mechanism 22 and enters the evaporator 19, and then enters the gas intake ports of the upper cylinder and the lower cylinder. Thus, one cycle of the refrigerant is completed. In order to realize the above function of adding enthalpy, the structure of the parts for realizing such function will be described below.

Figure 8:
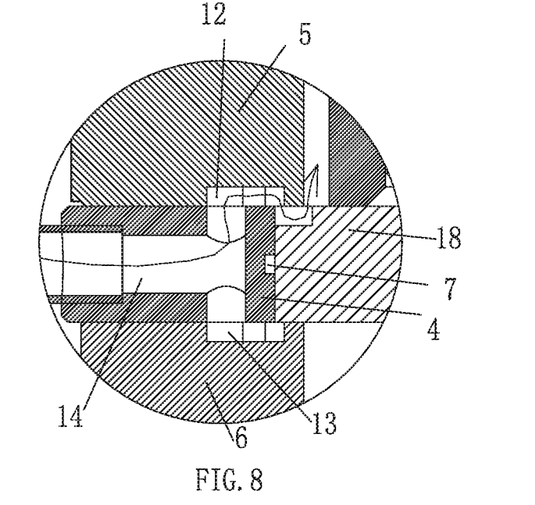
FIG. 8 is a structural view illustrating the assembly of the cylinders and the partition plate of the pump body assembly of the compressor according to the second embodiment of the present invention.

In this embodiment, the first enthalpy-adding groove 10 and the second enthalpy-adding groove 11 are respectively disposed on the upper end and the lower end of the outer periphery wall of the disc partition plate 18 of the crank shaft, and the three-way enthalpy-adding hole 14 is opened to the side surface of the annular partition plate 4. The curved groove with a circular guiding port, that is, the first communication channel 12, is disposed on the lower end surface of the upper cylinder 5 and is proximate to the disc partition plate 18 of the crank shaft; the curved groove with a circular guiding port, that is, the second communication channel 13, is disposed on the upper end surface of the lower cylinder 6 and is proximate to the disc partition plate 18 of the crank shaft. After the annular partition plate 4, the upper cylinder and the lower cylinder are assembled in layers, the three-way enthalpy-adding hole 14 in the annular partition plate 4 is connected to each curved groove with a circular guiding port disposed on the upper cylinder and the lower cylinder. The intersection angle θ1 between the starting end of the curved groove with a circular guiding port on the upper cylinder 5, the intersection angle β1 of the curved groove on the upper cylinder 5 and the first slide groove, the intersection angle θ2 between the starting end of the curved groove with a circular guiding port on the lower cylinder 6 and the second slide groove, and the intersection angle β2 of the curved groove on the lower cylinder 6, are all needed to be designed according to actual operating conditions of the compressor. When the rollers of the crank shaft rotate, the first enthalpy-adding groove 10 and the second enthalpy-adding groove 11 respectively disposed on the upper end surface and the lower end surface of the outer periphery wall of the disc partition plate 18 of the crank shaft are connected to the corresponding curved groove with a circular guiding port disposed respectively on the upper cylinder and the lower cylinder, and the position relations thereof are shown in FIG. 8.

Figure 9:
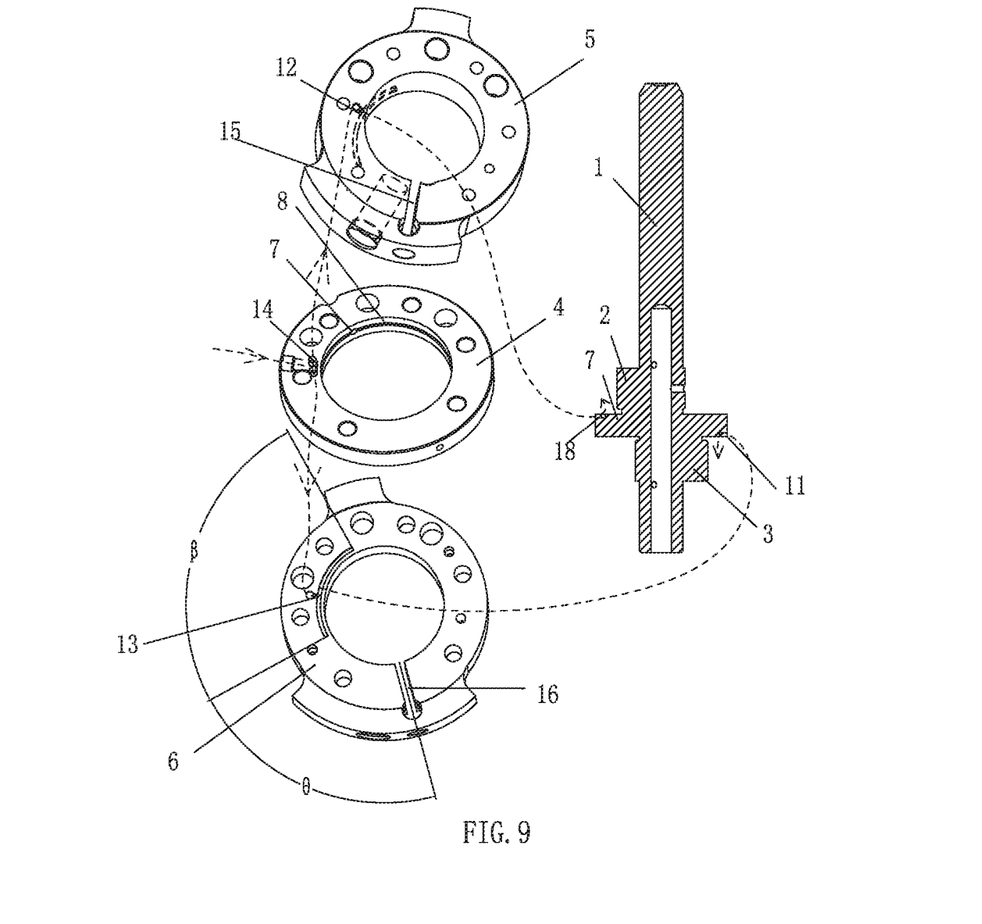
FIG. 9 is an exploded structural view of the pump body assembly of the compressor according to the second embodiment of the present invention.
Figure 10:
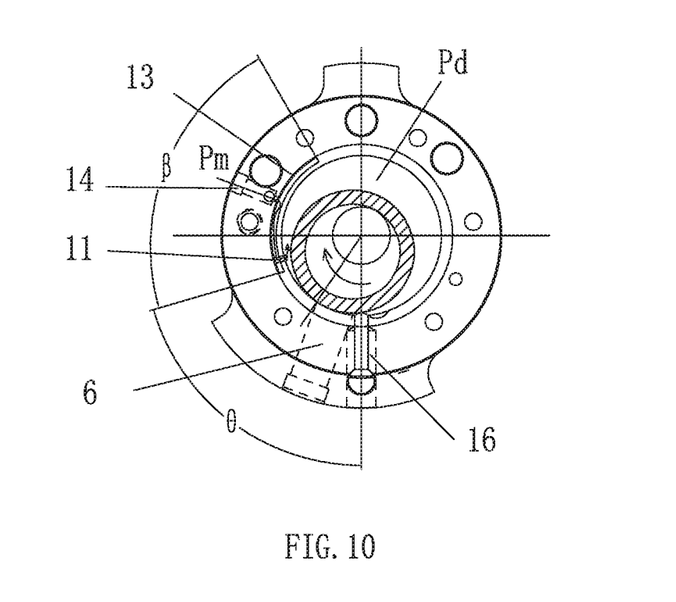
FIG. 10 is a first structural view illustrating the motion of the assembly of the partition plate and the cylinders of the pump body assembly of the compressor according to the second embodiment of the present invention.
Figure 11:
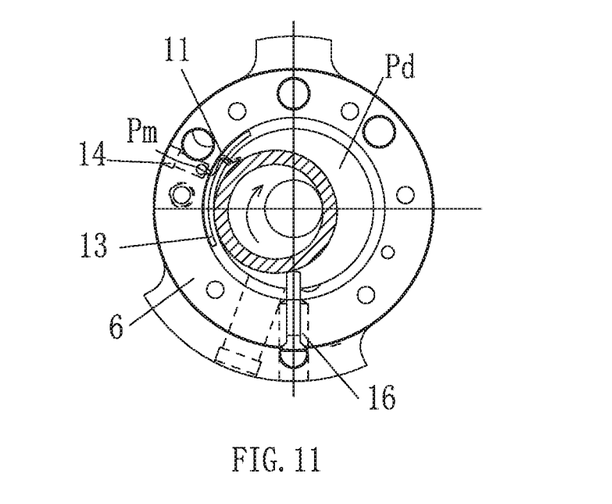
FIG. 11 is a second structural view illustrating the motion of the assembly of the partition plate and the cylinders of the pump body assembly of the compressor according to the second embodiment of the present invention.
Figure 12:
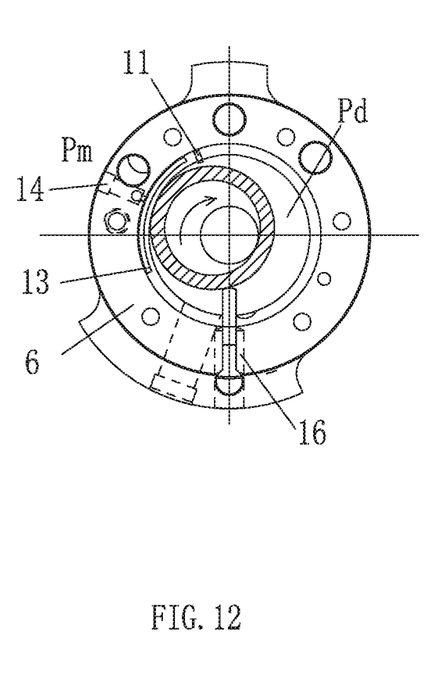
FIG. 12 is a third structural view illustrating the motion of the assembly of the partition plate and the cylinders of the pump body assembly of the compressor according to the second embodiment of the present invention.

As shown in FIGS. 9 to 11, taking the lower cylinder 6 as an example, along with the rotation of the crank shaft, when the roller rolls over the gas intake port of the lower cylinder 6, the compression chamber of the compressor and the gas intake ports of the lower cylinder are spaced by the lower roller. At this moment, the compression in the compression chamber of the compressor is just started, and the pressure Pd in the cylinder is the low pressure Ps, wherein, Pd<Pm; the second enthalpy-adding groove 11 on the disc partition plate 18 of the crank shaft starts to connect the second communication channel 13 on the lower cylinder 6, and the medium-pressure refrigerant from the inlet of the enthalpy-adding pipe is injected into the compression chamber of the lower cylinder 6, thereby realizing supplying gas and adding enthalpy in the compression process. As shown in the figures, in the process of the roller passing through the second communication channel 13, the pressure Pd of the refrigerant in the cylinder rises after the refrigerant is compressed, but still satisfies Pd<Pm; the medium-pressure refrigerant from the inlet of the enthalpy-adding pipe is still injected into the cylinder, but the amount of the refrigerant injected into the compression chamber of the cylinder decreases. When Pd>Pm is satisfied, the second enthalpy-adding groove 11 on the disc partition plate 18 of the crank shaft is separated from the second communication channel 13 on the lower cylinder 6, and the medium-pressure refrigerant from the inlet of the enthalpy-adding pipe isn't injected into the cylinder any more, and the enthalpy adding stops. At this period of time, the roller continuously compresses the mixed refrigerant in the cylinder, till the pressure reaches the exhaust back pressure and the refrigerant is discharged from the cylinder to start an external circulation. The enthalpy-adding process of the upper cylinder 5 is the same as that of the lower cylinder 6, except that there is a phase difference of 180°.

In order to realize supplying gas and adding enthalpy during the operation of the compressor, the focus is on the design of the intersection angle θ1 between the starting end of the curved groove with a circular guiding port on the upper cylinder 5 and the first slide groove, the intersection angle β1 of the curved groove on the upper cylinder 5, the intersection angle θ2 between the starting end of the curved groove with a circular guiding port on the lower cylinder 6 and the second slide groove, and the intersection angle θ2 of the curved groove on the lower cylinder 6. Additionally, the positions of the first enthalpy-adding groove 10 and the second enthalpy-adding groove 11 are configured to ensure that, after the compression chambers of the cylinders and the gas intake ports of the cylinders are spaced by the rollers, the first enthalpy-adding groove 10 is in communication with the first communication channel 12 in the upper cylinder 5, and the second enthalpy-adding groove 11 is in communication with the second communication channel 13 in the lower cylinder 6, so as to supply gas and add enthalpy. In addition, it should be ensured that, when the pressure in the compressor chamber reaches the pressure for adding enthalpy, the first enthalpy-adding groove 10 is separated from the first communication channel 12 in the upper cylinder 5, and the second enthalpy-adding groove 11 is separated from the second communication channel 13 in the lower cylinder 6, thereby preventing the compressed refrigerant from flowing back to the inlet of enthalpy-adding pipe.

Thus, the cylinders complete a complete cycle of gas intake, adding enthalpy, compression and exhaust. Through the structure of supplying gas and adding enthalpy of this embodiment, the refrigeration capacity per unit volume increases, and the energy efficiency is effectively improved. Furthermore, the problem of the blowby of the enthalpy-adding gas and the low-pressure Ps gas sucked existing in the conventional single-stage enthalpy-adding rotary compressor.

According to the embodiment of the present invention, as shown in FIG. 2, a compressor includes the pump body assembly described above.

The compressor is, for an example, a double-cylinder compressor, a multi-cylinder compressor, or a multi-stage compressor.

The compressor is a rotary compressor. The rotary compressor includes a housing 17, a motor stator, a motor rotor and a pump body assembly. An exhaust pipe is provided on the upper cover assembly of the housing 17; the motor stator is fixed inside the housing 17 and on the inner wall of the house 17; the motor rotor is fixed on the crank shaft of the pump body assembly and arranged inside an inner hole of the motor stator; the pump body assembly is welded and fixed on the housing 17. The pump body assembly includes an upper end cover 26, an upper bearing, a lower bearing, an upper cylinder 5, a partition plate, a lower cylinder 6, a lower end cover 27 and a crank shaft. The upper cylinder and the lower cylinder 6 are disposed between the upper bearing and the lower bearing, and an annular partition plate 4 is arranged between the upper cylinder 5 and the lower cylinder 6 to space the cylinders. An upper roller and a lower roller are respectively mounted on the upper cylinder 5 and the lower cylinder 6 and are respectively sleeved on the first eccentric component 2 and the second eccentric component 3 of the crank shaft. A liquid separator unit is disposed outside the housing 17, and two bent pipes of the liquid separator unit are in communication with the gas intake ports of the upper cylinder 5 and the lower cylinder 6. A lower cover and a mounting base are arranged on the bottom of the housing 17, and an upper cover assembly is mounted on the top of the housing, forming a closed chamber. When the compressor operates, the refrigerant is sucked from the liquid separator unit, and the refrigerant enters the cylinder to be compressed. The compressed high-pressure refrigerant enters the chamber of the housing 17, and enters the upper hollow cavity of the motor through a flow hole between the motor stator and the motor rotor and the rotor flow hole. Finally, the refrigerant is discharged from the compressor through the exhaust pipe provided on the upper cover assembly and enters the air conditioning system.

Of course, what described above are preferred embodiments of the present invention. It should be understood by those skilled in the art that various modifications and improvements can be made without departing from the basic principles of the present invention, and all these modifications and improvements are within the scope of the present invention.

What is claimed is:

1. A pump body assembly, comprising a crank shaft, an upper cylinder and a lower cylinder; wherein:
the crank shaft comprises a central rotating shaft, a first eccentric component, a second eccentric component, a disc partition plate and an annular partition plate;
the disc partition plate is disposed between the first eccentric component and the second eccentric component, and is integrally formed together with the central rotating shaft;
the annular partition plate is sleeved outside the disc partition plate;
the upper cylinder is sleeved outside the first eccentric component;
the lower cylinder is sleeved outside the second eccentric component;

an inner diameter ΦB of the annular partition plate and an outer diameter ΦD of the disc partition plate satisfy (ΦB−ΦD)>0.01 mm;

a first thickness H1 of the disc partition plate and a second thickness H2 of the annular partition plate satisfy (H2−H1)>0.01 mm; and an outer diameter ΦD of the disc partition plate and an inner diameter ΦC of the upper cylinder or the lower cylinder satisfy (ΦD−ΦC)>2 mm.

2. The pump body assembly according to claim 1, wherein, the disc partition plate is disposed between the upper cylinder and the lower cylinder, and forms a clearance fit with the upper cylinder.

3. The pump body assembly according to claim 1, wherein, an annular oil groove is provided on an inner periphery surface of the annular partition plate or on an outer periphery surface of the disc partition plate; and an oil channel is provided to allow oil to be inputted into the annular oil groove.

4. The pump body assembly according to claim 3, wherein, the oil groove is provided on the inner periphery surface of the annular partition plate; and the oil channel is an oil hole radially passing through the annular partition plate.

5. The pump body assembly according to claim 1, wherein, the upper cylinder, the annular partition plate and the lower cylinder are connected with bolts in a rigid manner.

6. The pump body assembly according to claim 1, wherein:
(a) an upper end of an outer periphery wall of the disc partition plate is provided with a first enthalpy-adding groove, which is in communication with a compression chamber of the upper cylinder; the annular partition plate is provided with an enthalpy-adding hole; a first communication channel, through which the first enthalpy-adding groove is in communication with the enthalpy-adding hole, is disposed on a bottom of the upper cylinder; or
(b) a lower end of the outer periphery wall of the disc partition plate is provided with a second enthalpy-adding groove, which is in communication with a compression chamber of the lower cylinder, and the annular partition plate is provided with an enthalpy-adding hole, and a second communication channel, through which the second enthalpy-adding groove is in communication with the enthalpy-adding hole, is disposed on a top of the lower cylinder; or
(c) both (i) an upper end of an outer periphery wall of the disc partition plate is provided with a first enthalpy-adding groove, which is in communication with a compression chamber of the upper cylinder; the annular partition plate is provided with an enthalpy-adding hole; a first communication channel, through which the first enthalpy-adding groove is in communication with the enthalpy-adding hole, is disposed on a bottom of the upper cylinder; and
(ii) a lower end of the outer periphery wall of the disc partition plate is provided with a second enthalpy-adding groove, which is in communication with a compression chamber of the lower cylinder, and the annular partition plate is provided with the enthalpy-adding hole, and a second communication channel, through which the second enthalpy-adding groove is in communication with the enthalpy-adding hole, is disposed on a top of the lower cylinder.

7. The pump body assembly according to claim 6, wherein, the first enthalpy-adding groove and the second enthalpy-adding groove are disposed on the disc partition plate; the enthalpy-adding hole is a three-way enthalpy-adding hole including a radially extended inlet, and a first outlet and a second outlet which are in communication with the inlet; wherein, the first outlet is in communication with the first enthalpy-adding groove through the first communication channel; and the second outlet is in communication with the second enthalpy-adding groove through the second communication channel.

8. The pump body assembly according to claim 7, wherein, the first communication channel and the second communication channel are both curved grooves.

9. The pump body assembly according to claim 8, wherein, the upper cylinder is provided with a first slide groove; the lower cylinder is provided with a second slide groove; an intersection angle θ1 is formed between a starting end of the first communication channel and the first slide groove, and an intersection angle θ2 is formed between the second communication channel and the second slide groove, which satisfy 30°<θ1<80° and 30°<θ2<80°.

10. The pump body assembly according to claim 8, wherein, an intersection angle β1 of the first communication channel satisfies 30°<β1<100°; and an intersection angle β2 of the second communication channel satisfies 30°<β2<100°.

11. A compressor, comprising the pump body assembly defined in claim 1.

12. The compressor according to claim 11, wherein, the compressor is a double-cylinder compressor, a multi-cylinder compressor, or a multi-stage compressor.

13. A pump body assembly, comprising a crank shaft, an upper cylinder and a lower cylinder; wherein:
the crank shaft comprises a central rotating shaft, a first eccentric component, a second eccentric component, a disc partition plate and an annular partition plate;
the disc partition plate is disposed between the first eccentric component and the second eccentric component, and is integrally formed together with the central rotating shaft;
the annular partition plate is sleeved outside the disc partition plate;
the upper cylinder is sleeved outside the first eccentric component;
the lower cylinder is sleeved outside the second eccentric component;
an inner diameter ΦB of the annular partition plate and an outer diameter ΦD of the disc partition plate satisfy (ΦB−ΦD)>0.01 mm; and
a first thickness H1 of the disc partition plate and a second thickness H2 of the annular partition plate satisfy (H2−H1)>0.01 mm;
wherein, an annular oil groove is provided on an inner periphery surface of the annular partition plate; and an oil channel is provided to allow oil to be inputted into the annular oil groove; and
wherein, the oil channel is an oil hole radially passing through the annular partition plate.

14. The pump body assembly according to claim 13, wherein:
(a) an upper end of an outer periphery wall of the disc partition plate is provided with a first enthalpy-adding groove, which is in communication with a compression chamber of the upper cylinder; the annular partition plate is provided with an enthalpy-adding hole; a first communication channel, through which the first enthalpy-adding groove is in communication with the enthalpy-adding hole, is disposed on a bottom of the upper cylinder; or (b) a lower end of the outer periphery wall of the disc partition plate is provided with a second enthalpy-adding groove, which is in communication with a compression chamber of the lower cylinder, and the annular partition plate is provided with an enthalpy-adding hole, and a second communication channel, through which the second enthalpy-adding groove is in communication with the enthalpy-adding hole, is disposed on a top of the lower cylinder; or (c) both (i) an upper end of an outer periphery wall of the disc partition plate is provided with a first enthalpy-adding groove, which is in communication with a compression chamber of the upper cylinder; the annular partition plate is provided with an enthalpy-adding hole; a first communication channel, through which the first enthalpy-adding groove is in communication with the enthalpy-adding hole, is disposed on a bottom of the upper cylinder; and (ii) a lower end of the outer periphery wall of the disc partition plate is provided with a second enthalpy-adding groove, which is in communication with a compression chamber of the lower cylinder, and the annular partition plate is provided with the enthalpy-adding hole, and a second communication channel, through which the second enthalpy-adding groove is in communication with the enthalpy-adding hole, is disposed on a top of the lower cylinder.

* * * * *